(12) United States Patent
Destro et al.

(10) Patent No.: US 10,072,109 B2
(45) Date of Patent: Sep. 11, 2018

(54) PROPYLENE BASED TERPOLYMERS

(71) Applicant: BASELL POLYOLEFINE ITALIA S.R.L., Milan (IT)

(72) Inventors: Mara Destro, Ferrara (IT); Marco Ciarafoni, Ferrara (IT); Paola Massari, Ferrara (IT); Tiziana Caputo, Ferrara (IT); Thomas Bohm, Darmstadt (DE)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 14/898,049

(22) PCT Filed: May 6, 2014

(86) PCT No.: PCT/EP2014/059201
§ 371 (c)(1),
(2) Date: Dec. 11, 2015

(87) PCT Pub. No.: WO2014/198459
PCT Pub. Date: Dec. 18, 2014

(65) Prior Publication Data
US 2016/0176996 A1    Jun. 23, 2016

(30) Foreign Application Priority Data
Jun. 11, 2013 (EP) .................................... 13171338

(51) Int. Cl.
*B32B 27/08* (2006.01)
*C08F 210/06* (2006.01)
*B65D 65/38* (2006.01)

(52) U.S. Cl.
CPC ............ *C08F 210/06* (2013.01); *B65D 65/38* (2013.01)

(58) Field of Classification Search
CPC ............ B32B 27/32; Y10T 428/31913; C08F 210/06; C08F 210/16; C08F 210/08

USPC ............ 428/34.7, 35.1, 516; 526/348, 348.2, 526/348.6
See application file for complete search history.

(56) References Cited

U.S. PATENT DOCUMENTS

| 6,388,040 B1 * | 5/2002 | Fujita ..................... C08F 10/00 526/126 |
| 2009/0274921 A1 | 11/2009 | Ackermans et al. |
| 2010/0137505 A1 | 6/2010 | Cavalieri et al. |

FOREIGN PATENT DOCUMENTS

| EP | 1209187 A1 | 5/2002 |
| EP | 1941997 A1 | 7/2008 |
| WO | WO-2009019169 A1 | 2/2009 |

OTHER PUBLICATIONS

PCT International Search Report and the Written Opinion—dated Jul. 25, 2014 for Corresponding PCT/EP2014/059201.

* cited by examiner

*Primary Examiner* — Ellen S Wood

(57) ABSTRACT

The present technology relates to container comprising a propylene, ethylene, 1-butene terpolymer wherein in the terpolymer:
i) the content of ethylene derived units ranges from 0.5 wt % to 1.8 wt %;
ii) the content of 1-butene derived units ranges from 3.5 wt % to 6.5 wt %;
iii) the ratio C2 wt %/C4 wt % ranges from 0.12 to 0.22; wherein C2 wt % is the weight percentage of ethylene derived units, and C4 wt % is the weight percentage of 1-butene derived units;
iv) the total content of ethylene and 1-butene derived units is comprised between 4.2 wt % and 7.5 wt %;
v) the melt flow rate (MFR measured according to ISO 1133, 230° C., 2.16 kg) ranges from 20 to 80 g/10 min;
vi) the xylene soluble fraction at 25° C. is lower than 7.0 wt %; and
vii) the melting point is higher than 140° C.

10 Claims, No Drawings

PROPYLENE BASED TERPOLYMERS

This application is the U.S. National Phase of PCT International Application PCT/EP2014/059201, filed May 6, 2014, claiming benefit of priority to European Patent Application No. 13171338.0, filed Jun. 11, 2013, the contents of which are incorporated herein by reference in its entirety.

FIELD OF THE INVENTION

The present technology relates to containers such as food containers having a beneficial balance of optical and mechanical properties. The containers comprise a propylene/ethylene/1-butene terpolymer having particular optical and mechanical properties.

BACKGROUND OF THE INVENTION

Propylene terpolymers are often used in commercial applications due to their desirable impact, rigidity and transparency properties. However, it can be difficult to find an acceptable balance between those properties, particularly when those properties contrast. For instance, compositions exhibiting a certain softness may comprise a high amount of xylene soluble fraction(s) that make them unsuitable for food container applications.

WO 98/58971 discloses a process for producing terpolymers of propylene, ethylene and other alpha-olefins comprising slurry and gas phase reactors connected together using a combination of two or more reactors connected in a cascade for producing a polymer product exhibiting a ratio of ethylene-to-butene of less than 0.3. However, the resulting terpolymer has a low melting temperature and somewhat narrow processing window that may reduce the usability of the polymer.

SUMMARY OF THE INVENTION

The present technology relates to terpolymers having improved optical properties that may be used for producing containers such as food containers. In some embodiments, the terpolymers comprise propylene, ethylene and 1-butene wherein:

i) the content of ethylene derived units ranges from 0.5 wt % to 1.8 wt %, including from 0.7 wt % to 1.5 wt % and from 0.9 wt % to 1.3 wt %;

ii) the content of 1-butene derived units ranges from 3.5 wt % to 6.5 wt %, including from 4.5 wt % to 6.0 wt %, from 5 wt % to 6.0 wt % and from 5.5 wt % to 6.0 wt %;

iii) the weight ratio of C2 wt %/C4 wt % ranges from 0.12 to 0.22, including from 0.14 to 0.20 and from 0.15 to 0.20; wherein the C2 wt % is the weight percentage of ethylene derived units and C4 wt % is the weight percentage of 1-butene derived units;

iv) the total content of ethylene and 1-butene derived units is between 4.2 wt % and 7.5 wt %, including between 4.5 wt % and 7.0 wt %;

v) the melt flow rate (MFR) measured according to ISO 1133 (230° C., 2.16 kg) ranges from 20 to 80 g/10 min; including from 25 to 70 g/10 min and from 31 to 52 g/10 min;

vi) the xylene soluble fraction at 25° C. is lower than 7.0 wt %; including lower than 6.0 wt % and lower than 5.5 wt %; and vii) the melting point is higher than 140° C.; for instance, between 140° C. and 152° C. and between 141° C. and 148° C.

DETAILED DESCRIPTION OF THE INVENTION

The term "terpolymer" means that a polymer contains only propylene, ethylene and 1-butene derived units, where the sum of the three comonomer derived units is 100 wt %.

The terpolymers of the present technology may, in some embodiments, have a fraction soluble in hexane (measured on film according to FDA 21 77:1520) lower than 3.4 wt %, including lower than 3.0 wt % and lower than 2.0 wt %. The terpolymer of the present technology may further produce a gloss measured on a 1 mm plaque of higher than 120%, including higher than 125% and higher than 128%.

In order to achieve a desirable MFR for the terpolymer, it is also possible to visbreak the polymer with one or more visbreaking agents such as peroxides. In certain embodiments, the terpolymers of the present disclosure may be characterized by an isotactic type stereoregularity where the xylene extractable value of the terpolymer is lower than 15 wt %. In further embodiments, the hexane extractable values for the terpolymers as measured according to FDA 21 77:1520 is lower than 2 wt %, including lower than 1.9 wt % and equal to or lower than 1.7 wt %.

Furthermore, containers comprising the terpolymers of the present may be characterized with a low haze value. For instance, in some embodiments the haze value for a container having 0.4 mm thick wall is lower than 5.0%, including lower than 4.0% and lower than 3.8%. In further embodiments, the top load of a container having 0.4 mm wall thick may be higher than 200 N, including higher than 250 N. The containers described herein may be produced by techniques such as injection molding.

The terpolymers of the present technology may be prepared by polymerization in one or more polymerization steps. Such polymerizations can be carried out in the presence of Ziegler-Natta catalysts, which may comprise a titanium compound having at least one titanium-halogen bond and an electron-donor compound, both supported on a magnesium halide in an active form. In additional embodiments, a further component (co-catalyst) such as an alkyl aluminum compound may be incorporated. In some embodiments, an external donor is optionally added.

Catalysts for use in the terpolymer production process described herein are capable of producing polypropylene with a value of xylene insolubility at ambient temperature greater than 90%, including greater than 95%, and have been described, e.g. in U.S. Pat. No. 4,399,054, EP Pat. No. 45977 and U.S. Pat. No. 4,472,524.

The solid catalyst components used in said catalysts comprise, as electron-donors (internal donors), compounds selected from the group consisting of ethers, ketones, lactones, compounds containing N, P and/or S atoms, and esters of mono- and dicarboxylic acids.

Electron-donor compounds for use in the present technology include esters of phtalic acid and 1,3-diethers of the following general formulas:

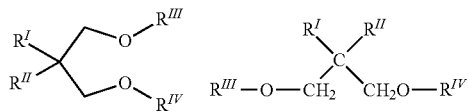

wherein $R^I$ and $R^{II}$ are the same or different and are $C_1$-$C_{18}$ alkyl, $C_3$-$C_{18}$ cycloalkyl or $C_7$-$C_{18}$ aryl radicals; $R^{III}$ and $R^{IV}$ are the same or different and are $C_1$-$C_4$ alkyl radicals; or are the 1,3-diethers in which the carbon atom in position 2 belongs to a cyclic or polycyclic structure made up of 5, 6, or 7 carbon atoms, or of 5-n or 6-n' carbon atoms, and respectively n nitrogen atoms and n' heteroatoms selected from the group consisting of N, O, S and Si, where n is 1 or 2 and n' is 1, 2, or 3, said structure containing two or three sites of unsaturation (cyclopolyenic structure), and optionally being condensed with other cyclic structures, or substituted with one or more substituents selected from the group consisting of linear or branched alkyl radicals; cycloalkyl, aryl, aralkyl, alkaryl radicals and halogens, or being condensed with other cyclic structures and substituted with one or more of the above mentioned substituents that can also be bonded to the condensed cyclic structures; one or more of the above mentioned alkyl, cycloalkyl, aryl, aralkyl, or alkaryl radicals and the condensed cyclic structures optionally containing one or more heteroatom(s) as substitutes for carbon or hydrogen atoms, or both. Ethers of this type are described in published EP Pat. Apps. 361493 and 728769.

Examples of these diethers include but are not limited to 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane and 9,9-bis (methoxymethyl) fluorene. Additional electron-donor compounds include phthalic acid esters such as diisobutyl, dioctyl, diphenyl and benzylbutyl phthalate.

It is also possible to use mixtures of at least two electron donor compounds, one of which may be present in an amount from 30% to 90% by mol with respect to the total donor concentration. The electron donors may be selected from succinates and 1,3 diethers.

The preparation of the above mentioned catalyst component may be performed, for example, when a $MgCl_2 \cdot nROH$ adduct, wherein n may be from 1 to 3 and ROH is ethanol, butanol or isobutanol, is reacted with an excess of $TiCl_4$ containing the electron-donor compound(s). The reaction temperature may be from 80 to 120° C. The solid is then isolated and reacted once more with $TiCl_4$, in the presence or absence of the electron-donor compound(s), after which it is separated and washed with aliquots of a hydrocarbon until all available chlorine ions have disappeared.

In the solid catalyst component the titanium compound, expressed as Ti, may be present in an amount from 0.5 to 10% by weight. The quantity of the electron-donor compound(s) which remains fixed on the solid catalyst component is, in some embodiments, 5 to 20% by mol with respect to the magnesium dihalide. The titanium compounds, which can be used for the preparation of the solid catalyst component, may be selected from halides and halogen alcoholates of titanium such as titanium tetrachloride.

The reactions described above result in the formation of a magnesium halide in active form. Other reactants that result in the formation of magnesium halide in an active form may be used, such as magnesium carboxylates.

The Al-alkyl compounds used as co-catalysts may comprise Al-trialkyls such as Al-triethyl, Al-triisobutyl, Al-tri-n-butyl, and linear or cyclic Al-alkyl compounds containing two or more Al atoms bonded to each other by way of O or N atoms, or $SO_4$ or $SO_3$ groups.

The Al-alkyl compound may be used in such a quantity that the Al/Ti ratio is from 1 to 1000.

The electron-donor compounds that can be used as external donors include aromatic acid esters such as alkyl benzoates and silicon compounds containing at least one Si—OR bond, where R is a hydrocarbon radical. Examples of these compounds include (tert-butyl)$_2$Si(OCH$_3$)$_2$, (cyclohexyl)(methyl)Si(OCH$_3$)$_2$, (cyclopentyl)$_2$Si(OCH$_3$)$_2$ and (phenyl)$_2$Si(OCH$_3$)$_2$ and (1,1,2-trimethylpropyl)Si(OCH$_3$)$_3$.

1,3-diethers having the formulae described above can also be used. If the internal donor is one of these diethers, the external donors can be omitted.

In some embodiments, the terpolymers may be prepared by using catalysts containing a phthalate as internal donor and (cyclopentyl)$_2$Si(OCH$_3$)$_2$ as an external donor, or 1,3-diethers as internal donors.

The propylene-ethylene-butene-1 terpolymers may be produced, in certain embodiments, with a polymerization process illustrated in EP Pat. App. 1 012 195.

The process described therein comprises feeding the monomers to polymerization zones in the presence of a catalyst under reaction conditions and collecting the polymer product from the polymerization zones. In some embodiments, the growing polymer particles flow upward through one (first) of the polymerization zones (riser) under fast fluidization conditions, leave the riser and enter another (second) polymerization zone (downcomer) through which the polymer particles flow downward in a densified form under the action of gravity, leave the downcomer and are reintroduced into the riser, thus establishing a circulation of polymer particles between the riser and the downcomer.

In the downcomer, high densities of the solid are reached, which approach the bulk density of the polymer. A positive gain in pressure can be obtained along the direction of flow, so that it becomes possible to reintroduce the polymer into the riser without the help of special mechanical means. In this way, a "loop" circulation is set up, which is defined by the balance of pressures between the two polymerization zones and by the head loss introduced into the system.

In some embodiments, the condition of fast fluidization in the riser is established by feeding a gas mixture comprising the relevant monomers to the said riser, such as conditions where the feeding of the gas mixture is effected below the point of reintroduction of the polymer into the said riser by the use of gas distributor means. The velocity of transport gas into the riser is higher than the transport velocity under the operating conditions, such as from 2 to 15 m/s.

In certain embodiments, the polymer and the gaseous mixture leaving the riser are conveyed to a solid/gas separation zone. The solid/gas separation can be effected by using conventional separation means. From the separation zone, the polymer may enter the downcomer. The gaseous mixture leaving the separation zone is compressed, cooled and transferred, in alternative embodiments with the addition of make-up monomers and/or molecular weight regulators, to the riser. The transfer can be effected by means of a recycle line for the gaseous mixture.

The control of the polymer circulating between the two polymerization zones can be effected by metering the amount of polymer leaving the downcomer using means for controlling the flow of solids, such as mechanical valves.

The operating temperature for the olefin polymerization processes described herein may be between 50 to 120° C. The first stage of the polymerization process can be carried out under operating pressures of between 0.5 and 10 MPa, including between 1.5 and 6 MPa.

In some embodiments, one or more inert gases may be maintained in the polymerization zones, in such quantities that the sum of the partial pressure of the inert gases is between 5 and 80% of the total pressure of the gases. In certain embodiments, the inert gas can be nitrogen or propane.

The various catalysts are fed up to the riser at any point of the riser. However, the catalysts can also be fed at any point of the downcomer. The catalyst can be in either a solid or liquid state.

Conventional additives, fillers and pigments and related compounds used in olefin polymers may be added, such as nucleating agents, extension oils, mineral fillers, and other organic and inorganic pigments. In particular, the addition of inorganic fillers, such as talc, calcium carbonate and mineral fillers, may improve some mechanical properties of the polymers, such as flexural modulus and HDT. Talc can also have a nucleating effect.

The nucleating agents are added to the compositions of the present technology in quantities ranging from 0.05 to 2% by weight, including from 0.1 to 1% by weight, with respect to the total weight.

The containers of the present disclosure can have various shapes, such as cubic, conic, or irregular shapes.

The following not-limiting examples are given to better illustrate the present technology.

EXAMPLES

The following characterization methods were used in testing the propylene terpolymers produced.

Determination of the Comonomer Content:
The comonomers content is determined by infrared spectroscopy by collecting the IR spectrum of the sample versus an air background with a Fourier Transform Infrared spectrometer (FTIR). The instrument data acquisition parameters are:
purge time: 30 seconds minimum
collection time: 3 minutes minimum
apodization: Happ-Genzel
resolution: 2 cm$^{-1}$.

Sample Preparation:
Using a hydraulic press, a thick sheet is obtained by pressing about 1 gram (g) of sample between two aluminum foils. If homogeneity is questionable, a minimum of two pressing operations are recommended. A small portion is cut from this sheet to mold a film. Recommended film thickness ranges between 0.02-0.05 cm (8-20 mils).

The pressing temperature is 180±10° C. (356° F.) and the sample is subjected to a pressure of about 10 kg/cm$^2$ (142.2 psi) for about one minute. The pressure is then released, the sample is removed from the press and then cooled to room temperature.

The spectrum of a pressed film of the polymer is recorded in absorbance versus wavenumbers (cm$^{-1}$). The following measurements are used to calculate ethylene and 1-butene content:

Area (At) of the combination absorption bands between 4482 and 3950 cm$^{-1}$, which is used for spectrometric normalization of film thickness.

Area (AC2) of the absorption band between 750-700 cm$^{-1}$, after two proper consecutive spectroscopic subtractions of an isotactic, non-additive polypropylene spectrum and then of a reference spectrum of a 1-butene-propylene random copolymer in the range 800-690 cm$^{-1}$.

Height (DC4) of the absorption band at 769 cm$^{-1}$ (maximum value), after two proper consecutive spectroscopic subtractions of an isotactic non-additive polypropylene spectrum and then of a reference spectrum of an ethylene-propylene random copolymer in the range 800-690 cm$^{-1}$.

In order to calculate the ethylene and 1-butene content, calibration lines for ethylene and 1-butene are obtained by using samples of known amounts of ethylene and 1-butene:

Calibration of ethylene:
Calibration straight line is obtained by plotting AC2/At versus ethylene molar percent (% C2m). The slope GC2 is calculated from a linear regression.

Calibration of 1-butene
A calibration straight line is obtained by plotting DC4/At versus butene molar percent (% C4 m). The slope GC4 is calculated from a linear regression.

Spectrum of the unknown sample is recorded and then (At), (AC2) and (DC4) of the unknown sample are calculated. The ethylene content (% molar fraction C2m) of the sample is calculated as follows:

$$\% \ C2m = \frac{1}{G_{C2}} \cdot \frac{A_{C2}}{A_t}$$

The 1-butene content (% molar fraction C4 m) of the sample is calculated as follows:

$$\% \ C4m = \frac{1}{G_{C4}} \cdot \left( \frac{A_{C4}}{A_t} - I_{C4} \right)$$

The propylene content (molar fraction C3 m) is calculated as follows:

$$C3m = 100 - \% \ C4m - \% \ C2m$$

The ethylene, 1-butene contents by weight are calculated as follows:

$$\% \ C2wt = 100 \cdot \frac{28 \cdot C2m}{(56 \cdot C4m + 42 \cdot C3m + 28 \cdot C2m)}$$

$$\% \ C4wt = 100 \cdot \frac{56 \cdot C4m}{(56 \cdot C4m + 42 \cdot C3m + 28 \cdot C2m)}$$

Melt Flow Rate (MFR "L") is determined according to ISO 1133 230° C., 2.16 kg.

Solubility in Xylene:
2.5 g of polymer and 250 ml of xylene are introduced in a glass flask equipped with a refrigerator and a magnetic stirrer. The temperature is raised in 30 minutes up to the boiling point of the solvent. The resulting clear solution is then kept under reflux and stirred for 30 minutes. The closed flask is then kept for 30 minutes in a bath of ice and water and in a thermostatic water bath at 25° C. for 30 minutes. The resulting solid is filtered on quick filtering paper. 100 ml of the filtered liquid is poured in a previously weighed aluminium container, which is heated on a heating plate under nitrogen flow, to remove the solvent by evaporation. The container is then kept on an oven at 80° C. under vacuum until a constant weight is obtained. The weight percentage of polymer soluble in xylene at room temperature is then calculated.

Flexural modulus is determined according to the ISO 178 method.

Haze (on 1 mm Plaque):
5×5 cm specimens are cut as molded plaques of 1 mm thickness and the haze value is measured using a Gardner photometer with Haze-meter UX-10 equipped with a G.E. 1209 lamp and filter C. The instrument calibration is made by carrying out a measurement in the absence of the sample (0% Haze) and a measurement with intercepted light beam (100% Haze).

The measurement and computation principle are given in the norm ASTM-D1003.

The plaques to be tested are produced according to the following method. 75×75×2 mm plaques are molded with a GBF Plastiniector G235/90 Injection Molding Machine, 90 tons under the following processing conditions:

Screw rotation speed: 120 rpm
Back pressure: 10 bar
Melt temperature: 260° C.
Injection time: 5 sec
Switch to hold pressure: 50 bar
First stage hold pressure: 30 bar
Second stage pressure: 20 bar
Hold pressure profile: First stage: 5 sec
Second stage: 10 sec
Cooling time: 20 sec
Mold water temperature: 40° C.
The plaques are conditioned for 12 to 48 hours at a relative humidity of 50% and temperature of 23° C.

Haze on Container:
The haze on container is measured by cutting 5×5 cm specimens from the container wall and using the same above procedure for the haze (on 1 mm plaque).

Top Load:
After at least 70 hours of conditioning at 23° C. and 50% relative humidity, a bottle comprising a terpolymer described herein is settled between the two plates of the dynamometer and compressed with a stress velocity of the plate of 10 mm/min.

The stress at collapse of the container is recorded and the value reported in N. The Top Load value is the mean value obtained from measurements repeated on 6 containers.

Container Impact Test (CIT):
The test is a biaxial impact test, the container, bottom up, was put on a sample holder having the same dimension of the container.

The plate for the impact has a diameter of 62 mm and a weight 5 kg and falls from 600 mm. The results are expressed in Joules (J). The results are an average of 10 tests.

Containers to be Tested:
Containers to be tested are produced with an injection molding machine with the following specs:
Injection molding unit parameters:
Injection screw stroke: 1200 kN
Screw diameter: 32 mm
Injected volume: 102.9 cm$^3$
Screw ratio L/D: 20
Max injection press: 2151 bar
The items to be tested have the following characteristics:
Volume: 250 cc
Surface treatment: Polished
The shape of the container is a truncated pyramid with a square base, wherein the top base has a side of 70 mm, the bottom base has a side of 50 mm and a height of 80 mm.

IZOD Impact Strength:
Determined according to ISO 180/1A. Samples have been obtained according to ISO 294-2.
Hexane extractables are measured according to FDA 21 77:1520.

Gloss:
Determined on the same specimens as for the haze value determinations.
The instrument used for the test was a Zehntner Model 1020 photometer for incident measurements. The calibration was made by carrying out a measurement at incidence angle of 60° on black glass having a standard gloss of 96.2% and a measurement at an incidence angle of 45° on black glass having a standard gloss of 55.4%.

Examples 1-2 and Comparative Example 3

Propylene terpolymers are prepared by polymerizing propylene, ethylene and butene-1 in the presence of a highly stereospecific Ziegler-Natta catalyst.

The Ziegler-Natta catalyst was prepared according to the Example 5, lines 48-55 of the EP Pat. No. EP728769. Triethylaluminum (TEA) was used as co-catalyst and dicyclopentyldimethoxysilane as external donor, with the weight ratios indicated in Table 1.

The above catalyst system is then transferred into a reactor containing an excess of liquid propylene and propane to carry out prepolymerization at 25° C. for 11 minutes before introducing it into a polymerization reactor.

The propylene terpolymers of the examples were prepared in a single gas-phase polymerization reactor comprising two interconnected polymerization zones, a riser and a downcomer, as described in the EP Patent No. 782587 and WIPO Pat. App. No. WO 00/02929. The propylene terpolymers are produced in the polymerization reactor by feeding in a continuous and constant flow the prepolymerized catalyst system, hydrogen (used as molecular weight regulator), propylene, ethylene and butene-1 in the gas state (the feeding quantities expressed in mol % are shown in table 1). The polymer particles exiting from the polymerization step were subjected to a steam treatment to remove the unreacted monomers and dried.

The other operative conditions are indicated in Table 1.

TABLE 1

| Polymerization Process | | | | |
|---|---|---|---|---|
| Example | | Ex.1 | Ex. 2 | Comparative Ex. 3 |
| TEAL/external donor | wt/wt | 6 | 6 | 4 |
| TEAL/catalyst | wt/wt | 6 | 6 | 6 |
| Temperature | ° C. | 72 | 72 | 75 |
| Pressure | bar-g | 26 | 26 | 27 |
| Split holdup riser | wt % | 42 | 40 | 41 |
| downcomer | wt % | 58 | 60 | 59 |
| $C_4^=$ riser | mole % | 3.5 | 5.2 | 2.5 |
| $C_2^=$ riser | mole % | 0.5 | 0.5 | 0.5 |
| $H_2/C_3^=$ riser | mol/mol | 0.12 | 0.046 | 0.058 |
| $C_4^=/(C_4^= + C_3^=)$ | mol/mol | 0.07 | 0.087 | 0.042 |

$C_2^=$ = ethylene $C_3^=$ = propylene $C_4^=$ = Butene

The polymer particles of examples 1-2 and comparative example 3 are introduced in an extruder, wherein the polymer particles are mixed with 500 ppm of Irganox 1010 and 1000 ppm of Irgafos 168 and 500 ppm of Ca stearate, 1000 ppm of GMS 90 and 4000 ppm of NX8000. The polymer particles are extruded under nitrogen atmosphere in a twin screw extruder, at a rotation speed of 250 rpm and a melt temperature of 200-250° C.

Properties of the obtained material have been reported in table 2 comparative example 4 is example 1 of WO 2009/019169:

TABLE 2

|  |  | Ex.1 1833 | Ex 2 1834 | Comp Ex 3 1835 | Comp Ex 4 |
| --- | --- | --- | --- | --- | --- |
| Ethylene content | Wt % | 0.9 | 1.1 | 1.0 | 3.10 |
| 1-butene content | Wt % | 5.6 | 5.7 | 2.9 | 5.9 |
| C2/C4 ratio |  | 0.16 | 0.19 | 0.34 | 0.52 |
| Total comonomer content | Wt % | 6.5 | 6.8 | 3.9 | 9 |
| Xylene soluble | Wt % | 3.3 | 5.0 | 3.7 | 10.0 |
| Hexane extractable on film | % | 1.4 | 1.7 | 1.5 | 3.5 |
| MFR | dl/g | 38 | 40 | 66 | 5.9 |
| Haze 1 mm plaque | % | 5.0 | 5.1 | 12.1 | — |
| Gloss 60° C. 1 mm plaque | % | 131 | 138 | 115 | 88 (on film) |
| Melting point | ° C. | 144.1 | 145.3 | 149.5 | 137.5 |

The polymers obtained were molded in containers as described above and analysed. The results are reported in Table 3.

TABLE 3

|  |  | Ex. 1 | Ex 2 | Comp Ex 3 |
| --- | --- | --- | --- | --- |
| Haze | % | 3.4 | 3.6 | 6.9 |
| Container Impact Test @ +23° C. | J | 2.2 | 2.1 | 1.5 |

As shown in Table 2, the compositions according to the present technology show improved haze and gloss properties with respect to Comparative Example 3, where the total comonomer content is lower than the claimed range, and Comparative Example 4, where the total comonomer content is higher than the claimed range. In Comparative Example 4, the value of gloss reported is measured on a 50 μm thick film. Thus the improvement is still higher since the value of the gloss on film is comparable with the value of the gloss on 1 mm plaque reported for the example of the present disclosure. This difference is enhanced in the container properties where the haze measured on the container of the examples of the present technology is lower and the impact test is higher with respect to Comparative Example 3.

The invention claimed is:

1. An injection molded container comprising a propylene, ethylene, and 1-butene terpolymer comprising:
   i) an ethylene derived content of 0.5-1.8 wt %;
   ii) a 1-butene derived content of 5-6 wt %;
   iii) a $C_2$ wt %/$C_4$ wt % ratio of 0.12-0.22; wherein $C_2$ wt % is the weight percentage of ethylene derived units and $C_4$ wt % is the weight percentage of 1-butene derived units;
   iv) a total content of ethylene and 1-butene derived units of 5.5-7 wt %;
   v) a melt flow rate (MFR, ISO 1133, 230° C., 2.16 kg) of 20-80 g/10 min;
   vi) a xylene soluble fraction at 25° C. lower than 7.0 wt %;
   vii) a melting point higher than 140° C.; and
   viii) a haze value for a 0.4 mm thick wall of the injection molded container of lower than 3.8%.

2. The injection molded container of claim 1, wherein the ethylene derived terpolymer content is 0.7-1.5 wt %.

3. The injection molded container of claim 1, wherein the terpolymer melting point is 140-152° C.

4. The injection molded container of claim 1, wherein the terpolymer has a gloss as measured on a 1 mm plaque of higher than 120%.

5. The injection molded container of claim 1, wherein the propylene, ethylene, and 1-butene terpolymer comprises a $C_2$ wt %/$C_4$ wt % ratio of 0.14-0.20; wherein $C_2$ wt % is the weight percentage of ethylene derived units and $C_4$ wt % is the weight percentage of 1-butene derived units.

6. The injection molded container of claim 1, wherein the propylene, ethylene, and 1-butene terpolymer comprises a $C_2$ wt %/$C_4$ wt % ratio of 0.15-0.20; wherein $C_2$ wt % is the weight percentage of ethylene derived units and $C_4$ wt % is the weight percentage of 1-butene derived units.

7. The injection molded container of claim 1, wherein the propylene, ethylene, and 1-butene terpolymer comprises a melt flow rate (MFR, ISO 1133, 230° C., 2.16 kg) of 25-70 g/10 min.

8. The injection molded container of claim 1, wherein the propylene, ethylene, and 1-butene terpolymer comprises a melt flow rate (MFR, ISO 1133, 230° C., 2.16 kg) of 31-52 g/10 min.

9. The injection molded container of claim 1, wherein the propylene, ethylene, and 1-butene terpolymer comprises a xylene soluble fraction at 25° C. lower than 6.0 wt %.

10. The injection molded container of claim 1, wherein the propylene, ethylene, and 1-butene terpolymer comprises a xylene soluble fraction at 25° C. lower than 5.5 wt %.

* * * * *